United States Patent [19]

Sakuma

[11] Patent Number: 4,764,852
[45] Date of Patent: Aug. 16, 1988

[54] POWER CIRCUIT ARRANGEMENT FOR ILLUMINATING A VANITY MIRROR BUILT INTO A VISOR

[75] Inventor: Toranosuke Sakuma, Shimizu, Japan

[73] Assignee: Koito Seisakusho Co., Ltd., Tokyo, Japan

[21] Appl. No.: 79,231

[22] Filed: Jul. 28, 1987

[30] Foreign Application Priority Data

Jul. 28, 1986 [JP] Japan ................. 61-176894

[51] Int. Cl.[4] ............. B60J 3/00; B60Q 1/00; F21V 33/00
[52] U.S. Cl. ............................ 362/135; 362/141; 362/137; 362/144; 362/61
[58] Field of Search ............... 362/135, 137, 141, 144, 362/61, 80, 137, 368, 251, 802, 231, 270

[56] References Cited

U.S. PATENT DOCUMENTS

| | | | |
|---|---|---|---|
| 2,123,319 | 7/1938 | Thompson | 362/141 |
| 3,211,903 | 10/1965 | McElraath | 362/141 |
| 3,926,470 | 12/1975 | Marcus | 362/61 |
| 4,000,404 | 12/1976 | Marcus | 204/2 R |
| 4,174,864 | 11/1979 | Viertel et al. | 362/144 |
| 4,203,149 | 5/1980 | Viertel et al. | 362/144 |
| 4,213,169 | 7/1980 | Keompkers | 362/141 |
| 4,227,241 | 10/1980 | Marcus | 362/137 |
| 4,227,242 | 10/1980 | Marcus | 362/137 |
| 4,591,956 | 5/1986 | Majchrzak | 362/135 |
| 4,652,982 | 3/1987 | Flowerday | 362/135 |

Primary Examiner—Raymond A. Nelli
Attorney, Agent, or Firm—Browdy and Neimark

[57] ABSTRACT

A vanity mirror mounted to a vehicular visor via a mirror frame of electrically insulating material has a pair of illuminating lamps on its opposite sides. The lamps have their opposite polarity terminals electrically coupled to, and mechanically supported by, a pair of sheet-metal power conductors and a pair of sheet-metal ground conductors. The sheet-metal power conductors are electrically interconnected and coupled to a power line via an on-off switch. The sheet-metal ground conductors are secured, each by a threaded fastener element of electrically conducting material, to a visor frame of conducting material which is to be held at ground potential. The fastener elements serve the purpose of both grounding the required lamp terminals and mounting the complete vanity mirror assembly to the visor. No wiring is required for grounding the lamps.

14 Claims, 14 Drawing Sheets

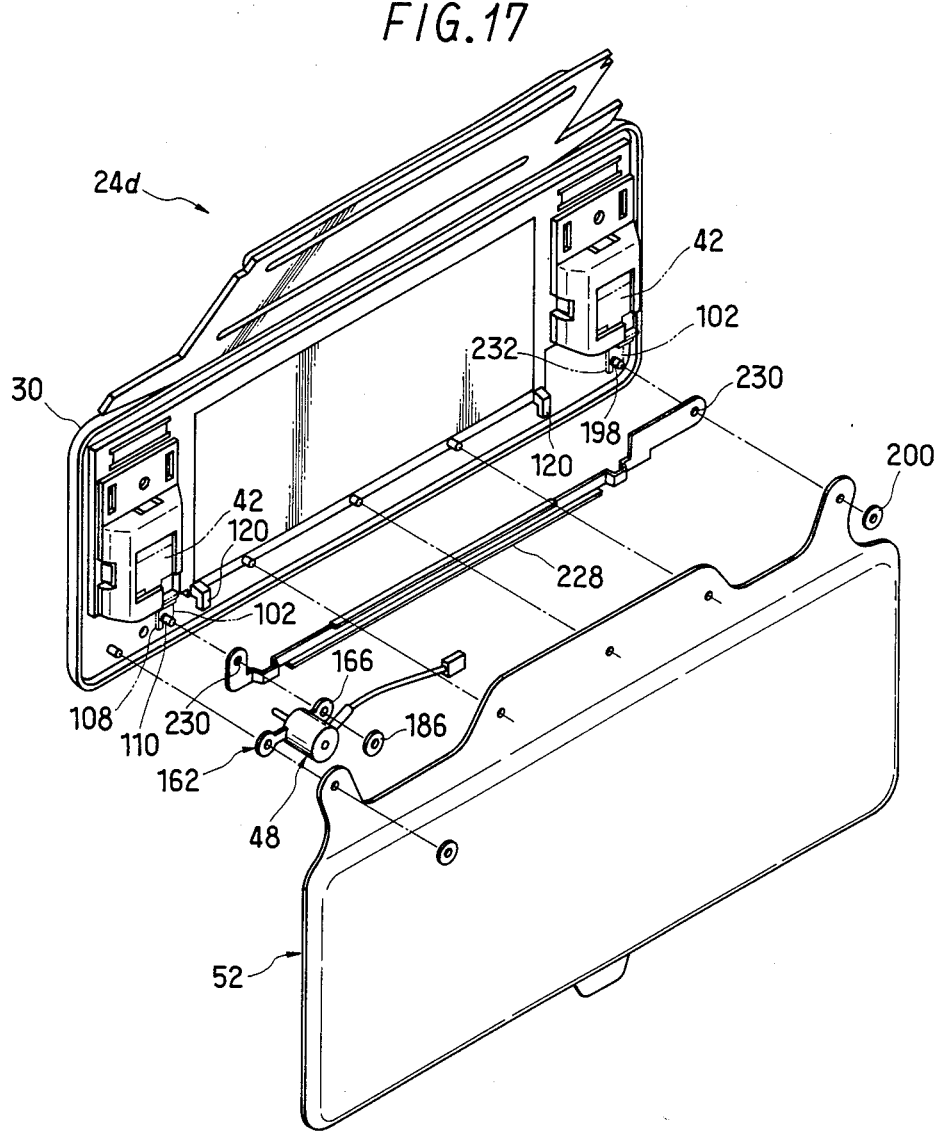

POWER CIRCUIT ARRANGEMENT FOR ILLUMINATING A VANITY MIRROR BUILT INTO A VISOR

BACKGROUND OF THE INVENTION

This invention relates to a working combination of a visor and a lighted vanity mirror assembly for use on motor vehicles, notably passenger cars, although no limitation thereto is intended. More specifically, the invention pertains to a simplified power circuit arrangement for the lighting means of the vanity mirror assembly.

Visors with built-in vanity mirrors have for some time now been installed on automobiles, particularly on the passenger's side of the front seat. It has also been known to mount a pair of lamps on both sides of the mirror to provide illumination for the viewer or any other object that may advantageously be illuminated in the vehicle (e.g. a map). U.S. Pat. No. 4,000,404 to Marcus represents a typical example of such visor assembly having a lighted vanity mirror. Marcus employs a coaxial cable for the supply of power to the pair of lamps from a vehicle battery. The coaxial cable has its outer conductor (braided metal sheath) connected to the negative terminals of the lamps, and its inner conductor connected to the positive terminals of the lamps via a switch. Marcus does not teach, however, how the outer conductor of the cable is grounded, although it can be supposed that it may be coupled to the vehicle chassis at some point or other.

The use of a coaxial cable is preferable to that of separate positive and negative cords or other forms of conductors because of the reduced number of parts. Nevertheless, Marcus' lamp power circuitry is objectionable because the outer conductor of the cable must have its opposite extremities coupled to the vehicle chassis and to the ground terminal of the lamp circuitry. The assemblage of this prior art visor assembly is not so simple as can be desired.

SUMMARY OF THE INVENTION

The present invention solves the problem of how to simplify the power circuitry of an illuminated vanity mirror of a visor assembly and hence of how to expedite the assemblage or manufacture of the visor assembly.

Briefly, the invention may be summarized as a visor assembly for use on a motor vehicle or the like, wherein a vanity mirror assembly is incorporated with a visor having frame means of electrically conducting material to be held at ground potential. The vanity mirror assembly includes a mirror mounted to the visor via a mirror frame of electrically insulating material, a pair of lamps disposed on opposite sides of the mirror and each having first terminal and terminals, and power conductor means coupled, both mechanically and electrically, to the first terminals of the lamps for conducting current thereto. Also included is ground conductor means which is coupled, both mechanically and electrically, to the second terminals of the lamps and to the frame means of the visor for grounding the second terminals of the lamps. The ground conductor means further coacts with the power conductor means for supporting the lamps in place on the mirror frame.

The visor frame is customarily metal-made and, being coupled to the vehicle chasses both mechanically and electrically, is normally at ground potential. The lamps of the mirror assembly can be grounded by connecting their negative terminals to the visor frame via the ground conductor means which coacts with the power conductor means for holding the lamps in place on the mirror frame. No wiring, cord or the equivalent is required for grounding the lamps in accordance with the teachings of this invention.

Preferably, as in the preferred embodiments of the invention to be presently subsequently, the pair of lamps are disposed one in each of a pair of lighting compartments defined by the mirror frame on both sides of the mirror. The ground conductor means comprises a pair of sheet-metal ground conductors disposed one in each lighting compartment and coupled one to the second terminal of each lamp both mechanically and electrically. The power conductor means likewise comprises a pair of electrically interconnected sheet-metal power conductors mounted one in each lighting compartment and coupled one to the first terminal of each lamp both mechanically and electrically. Thus each lamp is mechanically supported by one sheet-metal power conductor and one sheet-metal ground conductor.

With such preferred construction the lamps can be grounded as the pair of sheet-metal ground conductors are fastened to the visor frame via the mirror frame each by a screw or like fastener element of electrically conducting material. The fastener elements serve not only for grounding the lamps but also for fastening the complete vanity mirror assembly to the visor and, additionally, for securing the sheet-metal ground conductors to the mirror frame. It should be appreciated that the lamps can be grounded merely as the vanity mirror assembly is mounted to the visor or, stated conversely, that the complete mirror assembly can be mounted in place on the visor simply as its constituent lamps are grounded via the fastener elements.

The above and other features and advantages of this invention and the manner of realizing them will become more apparent, and the invention itself will best be understood, from a study of the following description and appended claims, with reference had to the attached drawings showing some preferable embodiments of the invention.

BRIEF DESCRIPTION OF THE DRAWINGS

FIG. 17 is an exploded perspective view of a fourth alternative vanity mirror assembly, also to be incorporated with the visor of FIGS. 1-5, featuring another example of means for electrically interconnecting the pair of sheet-metal ground conductors.

DESCRIPTION OF THE PREFERRED EMBODIMENTS

General

Figure 1:
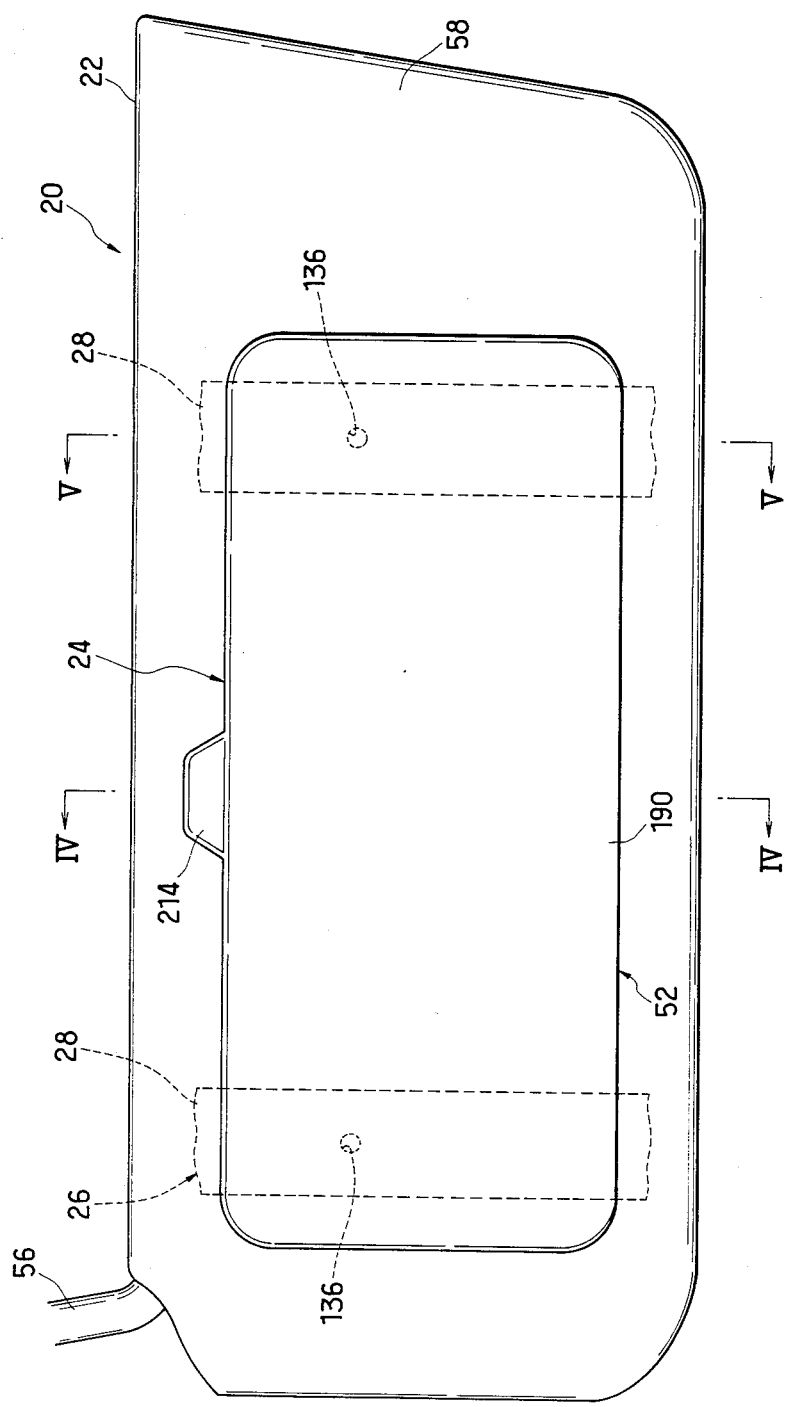
FIG. 1 is a front elevation of the visor assembly having a built-in lighted vanity mirror assembly in accordance with the novel concepts of this invention, the vanity mirror assembly being shown with its mirror cover in a closed position.

The visor assembly of this invention will now be described more specifically as adapted for use on a passenger car. Generally denoted 20 in FIGS. 1-5, the representative visor assembly may be thought of as comprising a visor proper 22 and a vanity mirror assembly 24. The visor 22 can be of generally conventional make. Suffice it to say for the moment that it has a metal-made visor frame 26, FIG. 1, including a pair of spaced frame members 28, which is held at ground potential in the place of installation of the visor assembly 20. The vanity mirror assembly 24 incorporates many features of the invention to be set forth hereafter.

Figure 6:
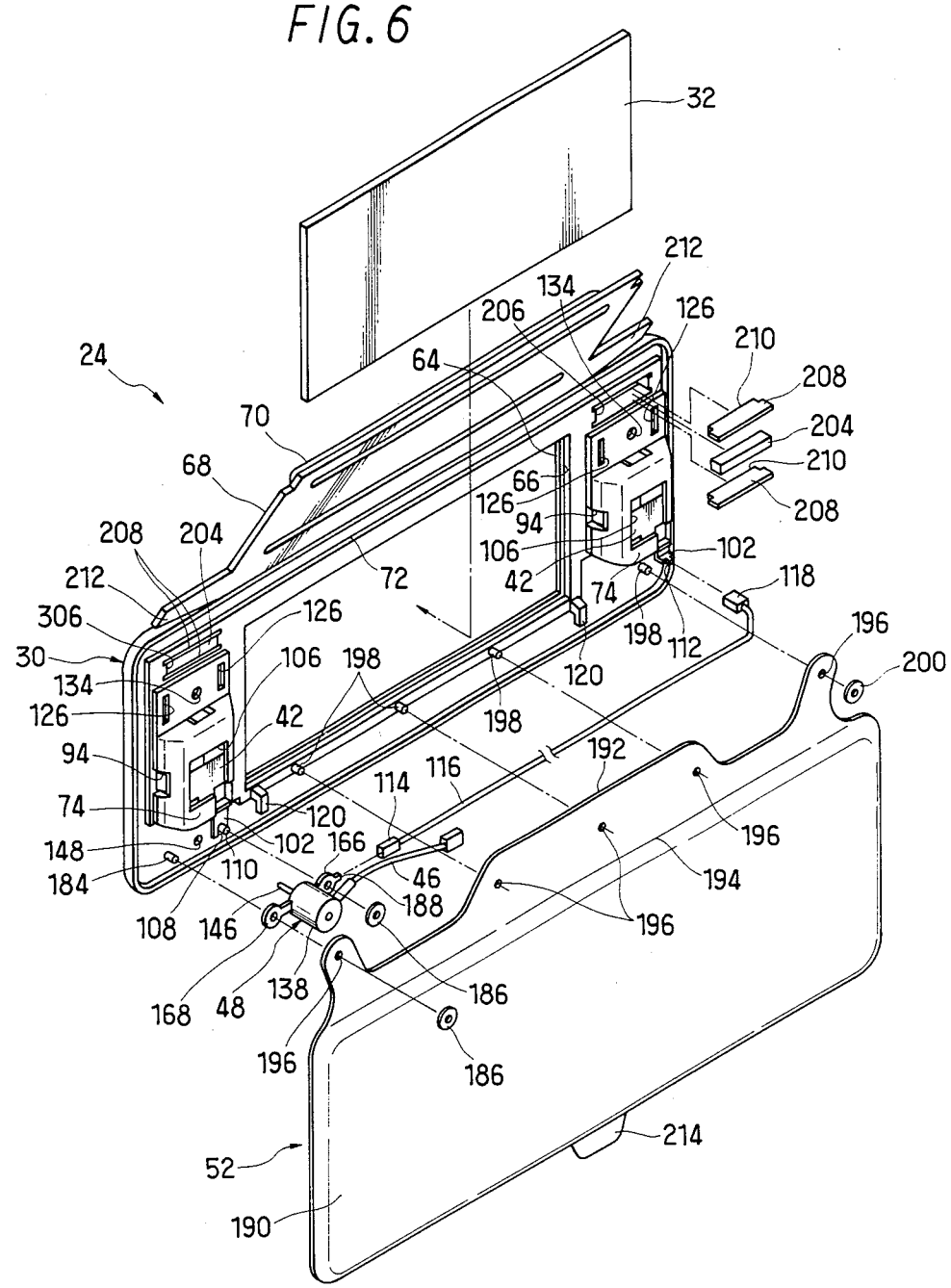
FIG. 6 is an exploded perspective view of the vanity mirror assembly as seen from its rear side in order to clearly reveal, in particular, the electric power circuit arrangement for the lamps of the mirror assembly.
Figure 7:
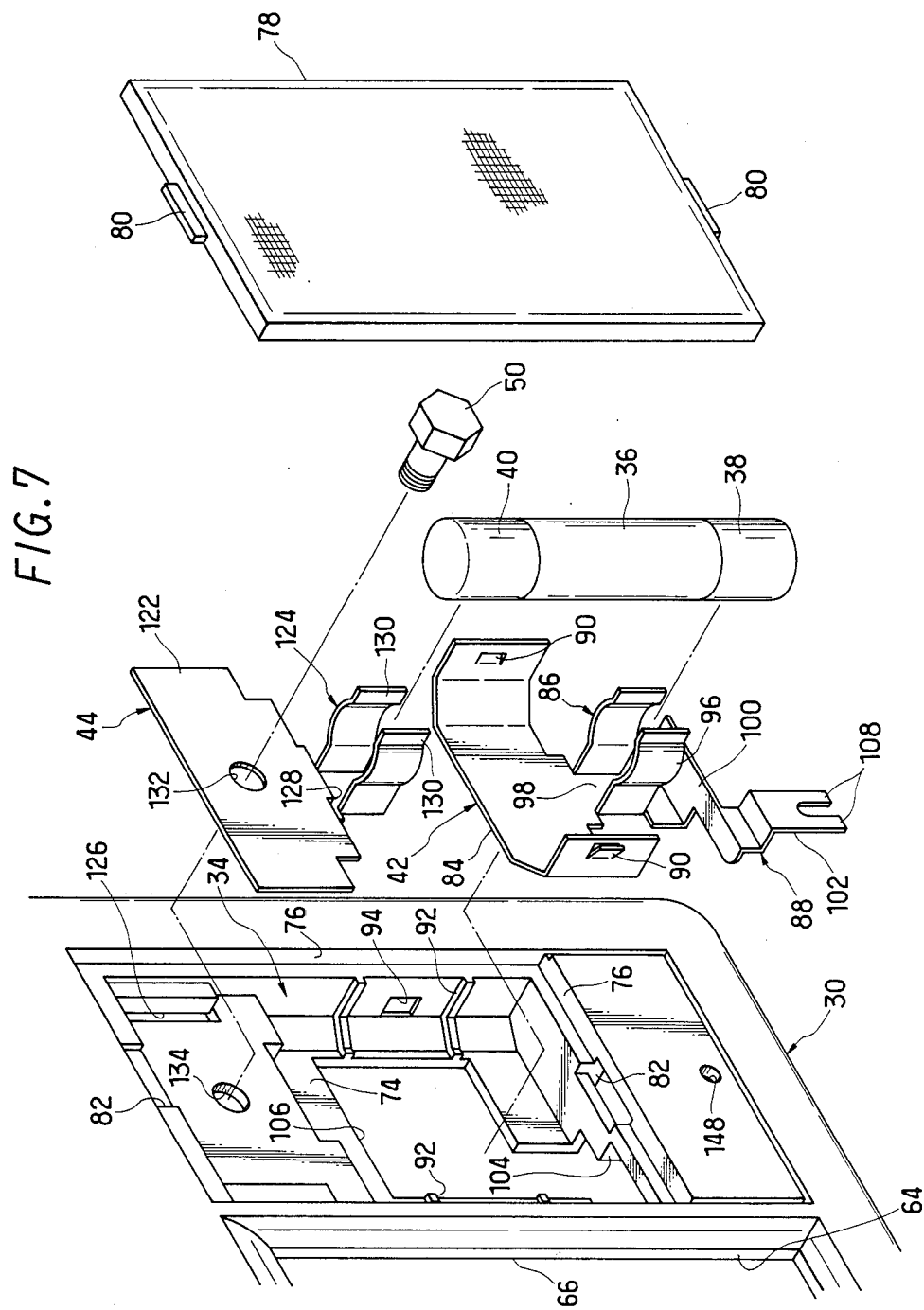
FIG. 7 is a fragmentary, enlarged, exploded perspective view of the vanity mirror assembly, showing in particular one of the lighting compartments together with the various means mounted therein and a lens closing the front side of the lighting compartment.

As better pictured in FIG. 6, the vanity mirror assembly 24 has a molded-plastic mirror frame 30 for supporting a vanity mirror 32. The mirror frame 30 further defines a pair of lighting compartments 34, one shown in FIGS. 2 and 7, on both sides of the vanity mirror 32. Each lighting compartment 34 houses a lamp 36 of generally cylindrical shape for illuminating the vanity mirror 32. FIG. 7 further indicates that each lamp 36 has its opposite polarity terminals 38 and 40 mechanically supported by, and electrically coupled to, a sheet-metal power conductor 42 and sheet-metal ground conductor 44.

Figure 3:
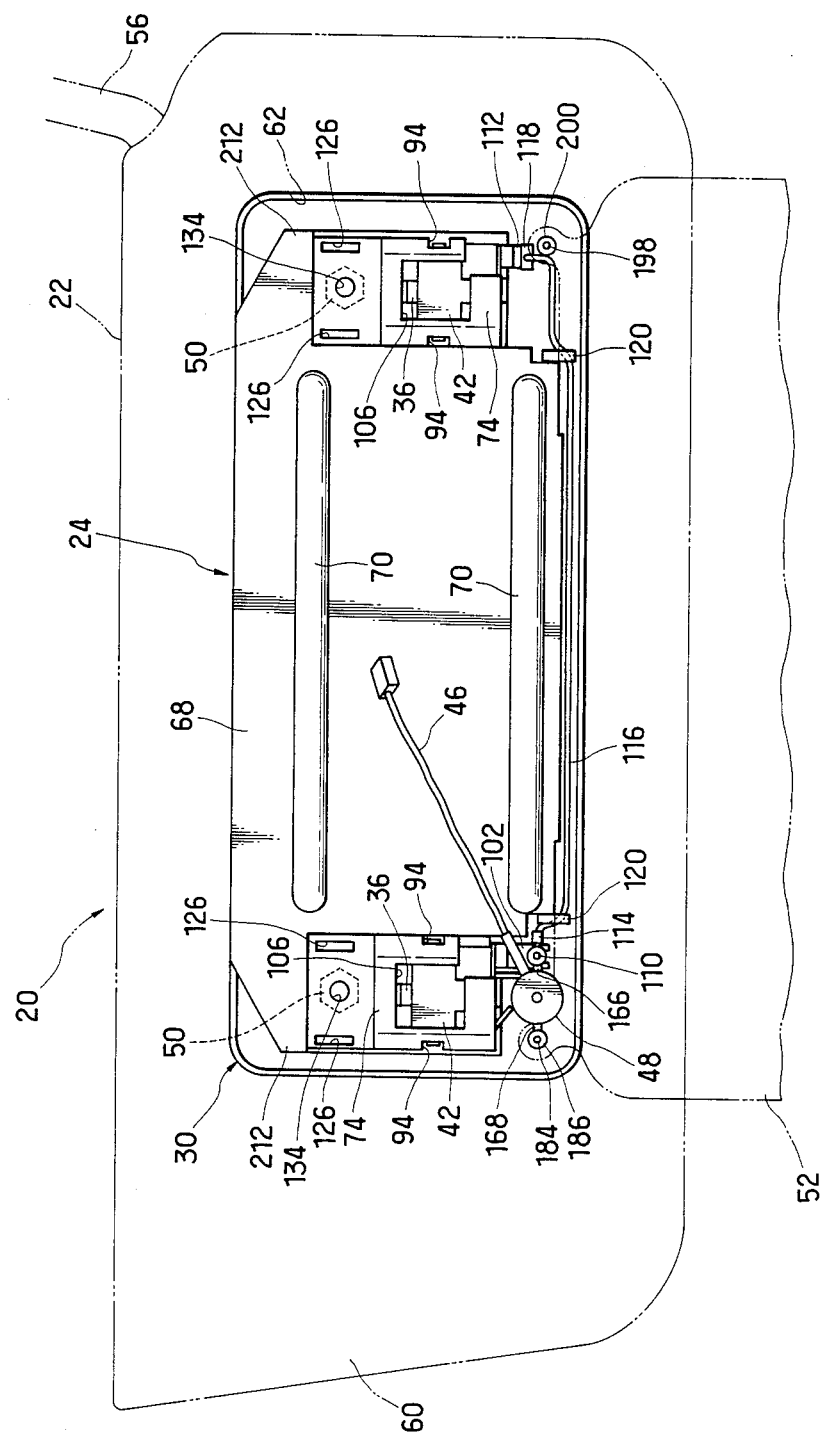
FIG. 3 is a rear elevation of the vanity mirror assembly shown together with a phantom outline of the visor incorporated therewith.

As will be seen by referring to both FIGS. 3 and 6, the pair of sheet-metal power conductors 42 are electrically coupled to a power line or cord 46 via an on-off switch 48. Each sheet-metal ground conductor 44, on the other hand, is coupled to the visor frame 26 by a fastener element such as a screw 50 best seen in FIG. 7. Being metal made, the screws 50 serve not only to mechanically fasten the ground conductors 44, and hence the complete vanity mirror assembly 24, to the visor 22 but also to electrically connect the terminals 40 of the lamps 36 to the visor frame 26 at ground potential.

The vanity mirror assembly assembly 24 further includes a hinged mirror cover 52, seen in all of FIGS. 1-6, for covering and uncovering the vanity mirror 32 and lighting compartments 34. The mirror cover 52 performs the additional function of actuating and deactuating the on-off switch 48.

The following is a more detailed discussion of the above recited visor 22, vanity mirror frame 30, pair of sheet-metal power conductors 42, pair of sheet-metal ground conductors 44, on-off switch 48, and vanity mirror cover 52, in that order and under separate headings. Operational description will follow the discussion of the listed components.

Visor

Figure 2:
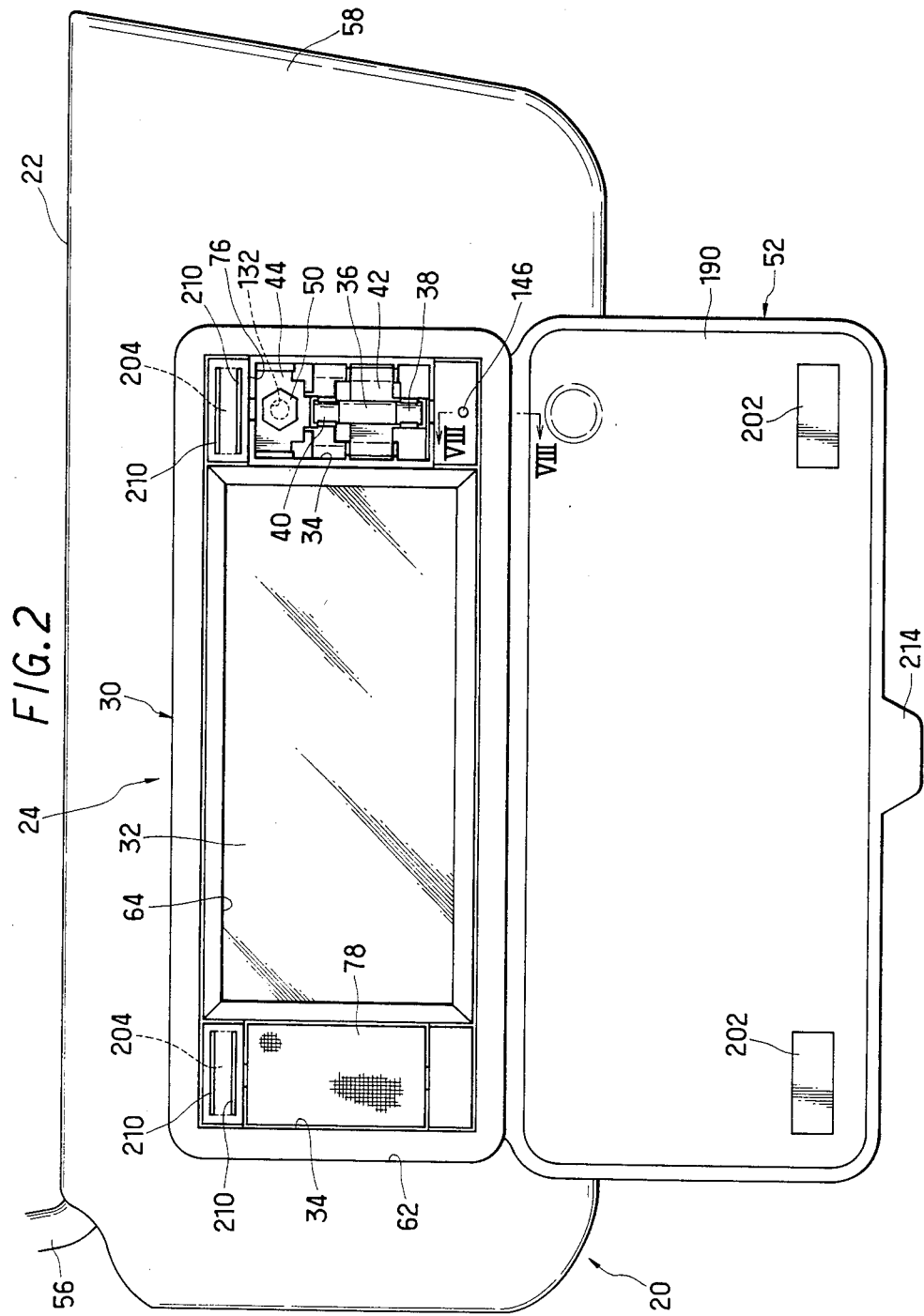
FIG. 2 is a view similar to FIG. 1 except that the vanity mirror assembly is shown with its mirror cover in an open position, the mirror assembly being also shown with one of its lighting compartments uncovered to reveal the lamp and other parts mounted therein.

The visor 22 may conventionally comprise a core or padding, not shown, of any suitable soft or pliant material such as a plastic foam enveloping the visor frame 26, and a covering 54 of any such material as cloth, leather, vinyl, etc. As shown in FIGS. 1-3, a metal-made support rod 56 connects the visor 22 to a vehicle chassis, not shown, at such a point just above the vehicle windshield, also not shown. Generally flat and rectangular in shape, the visor 22 is pivotable about the support rod 56 between a working position, in which the visor is disposed in an approximately vertical plane for shielding the driver's or passenger's eyes from the sunlight, and a retracted position above the windshield.

FIGS. 1-3 are drawn on the assumption that the visor 22 is in the working position, with its front side 58 directed toward the front seat occupant. FIG. 3 reveals the rear side 60 of the visor 22 in phantom outline. Hereinafter in this specification the directional terms "front" and "rear", as well as "forward" and "backward", and derivatives thereof, will be used in reference to these front side 58 and rear side 60 of the visor 22. Thus, for example, the front seat occupant should be understood to be located forwardly of the visor 22 when the latter is in the working position.

The visor 22 has a recess 62, FIGS. 2 and 3, of rectangular, horizontally elongated shape defined in its front side 58 for the installation of the vanity mirror assembly 24. It will be observed from FIG. 2 that the noted pair of visor frame members 28 extend across the recess 62 in the vicinities of its pair of shorter sides. These frame members 28 are coupled to the support rod 56 both mechanically and electrically.

Vanity Mirror Frame

Although the vanity mirror frame 30 appears in all of FIGS. 1–7, its construction will be perhaps best understood from a study of FIG. 6. The mirror frame 30 is shaped and sized to fit in the recess 62 in the front side 58 of the visor 22. Defined centrally in the mirror frame 30 is a rectangular opening 64 with its four bounding edges all stepped at 66. These steps 66 are such that the vanity mirror 32 is to be placed in the opening 64 from the rear side of the mirror frame 30. So mounted in position, the vanity mirror 32 is restrained from falling forwardly by the steps 66 and rearwardly by a mirror backing 68 complete with reinforcing hollow ribs 70.

Figure 4:
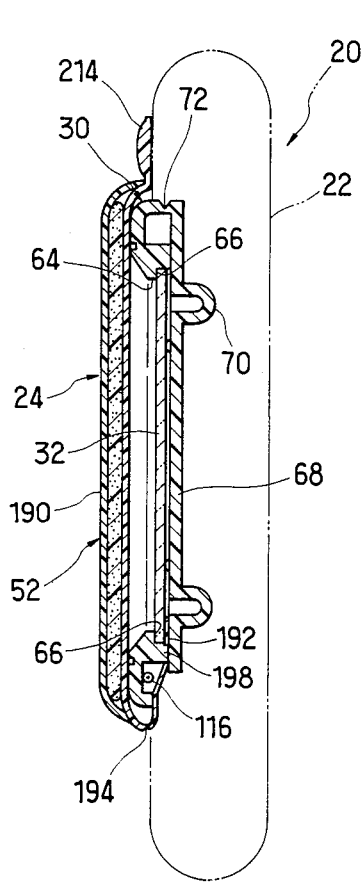
FIG. 4 is a section through the vanity mirror assembly, taken along the line IV—IV in FIG. 1 and showing its cross-sectional construction.

Preferably, and as shown, the mirror backing 68 is molded in one piece with the mirror frame 30 and is joined thereto via a "live" hinge 72 at the top of the mirror frame. FIG. 4 clearly indicates that the "live" hinge 72 is formed by forming a groove of V-shaped cross section at the joint between mirror frame 30 and mirror backing 68. After the mounting of the vanity mirror 32 in the opening 64, the mirror backing 68 may be folded over the back of the mirror. The free bottom edge of the mirror backing 68 may then be united with the mirror frame 30 as by adhesion, heat sealing, etc. The one-piece molding of the mirror frame 30 and mirror backing 68 is recommended by reasons of the ease of fabrication and the smaller number of parts. However, the two parts may of course be molded separately and, after the mounting of the vanity mirror 32, may be joined as by ultrasonic fusion, adhesion or any other known method.

With reference to both FIGS. 2 and 7 in particular, the mirror frame 30 further defines the pair of lighting compartments 34 on the opposite sides of the vanity mirror 32. FIG. 7 shows that each lighting compartment 34 has an apertured rear wall 74 and a front end opening defined by stepped edges 76. The depicted complex shape of the rear wall 74 is required for the mounting of the sheet-metal power conductor 42 and ground conductor 44 and will be later explained in connection with these conductors.

The front end opening of each lighting compartment 34 is closed by a lens 78 of rectangular shape having a pair of tongues 80 on its top and bottom edges. These tongues 80 are engaged in an associated pair of slots 82 to the mirror frame 30, holding the lens 78 in place thereon against the possibility of accidental detachment. The pair of lenses 78 function to direct the illumination due to the lamps 36 toward the viewer or any other object located forwardly of the vanity mirror 32.

Sheet-Metal Powder Conductors

The pair of sheet-metal power conductors 42 are substantially, and not exactly, alike in construction, so that the common construction of both conductors will first be described with reference to FIG. 7. As the name implies, each sheet-metal power conductor 42 is an integral fabrication of sheet-metal material, comprising a mount-portion 84 to be mounted to the apertured rear wall 74 of the associated lighting compartment 34, a lamp contact portion 86 for embracingly engaging the terminal 38 of the associated lamp 36 in electrical contact therewith, and a terminal portion 88 to be electrically connected both to the similar terminal portion of the other sheet-metal power conductor 42 and to the on-off switch 48.

The mount portion 84 of each sheet-metal power conductor 42 is generally U-shaped as viewed from above or below and has a pair of lugs 90 punched out from its two parallel limbs. This mounted portion 84 is seated against the rear wall 74 of the associated lighting compartment 34 by being engaged between a pair of parallel spaced ribs 92 thereon. The pair of lugs 90 are engaged in respective openings 94, one seen in FIG. 7, in the compartment wall 74, locking the complete power conductor 42 against accidental detachment.

The lamp contact portion 86 of each sheet-metal power conductor 42 comprises a pair of lamp support arms 96 extending forwardly from a portion 98 depending from the mount portion 84. The lamp support arms 96 are partly curved oppositely into arcs of a circle for holding therebetween the lower terminal 38 of the lamp 36. The lamp support arms 96 are self-biased against the lamp terminal 38 thereby firmly engaging the same mechanically besides being in electrical contact therewith.

The terminal portion 88 of each sheet-metal power conductor 42 is generally in the shape of a recumbent L as seen in a front view as in FIG. 2, comprising a horizontal limb 100 joined at one end to the lamp contact portion 86, and a vertical limb 102 depending from the other end of the horizontal limb. Although the horizontal limb 100 is disposed in one lighting compartment 34, and vertical limb 102 extends downwardly through part 104 of the aperture 106 in the compartment wall 74.

Thus, as will be noted from FIGS. 3 and 6, the vertical limbs or terminals proper 102 of the terminal portions 88 of the two sheet-metal power conductors 42 are both located behind the vanity mirror frame 30. It will also be observed from FIG. 6 in particular that the left-hand power conductor terminal 102, as seen in that figure, is bifurcated at 108 to engage a pin 110 molded in one piece with the mirror frame 30 whereas the right-hand power conductor terminal 102 terminates in a plug 112. The left-hand power conductor terminal 102 is electrically connected to the on-off switch 48 and thence to a socket 114 at one extremity of a length of cord 116. This cord 114 has another socket 118 at the other extremity thereof, which is engaged with the plug 112 of the right-hand power conductor terminal 102. Thus the pair of sheet-metal power conductors 42, and therefore the lower terminals 38 of the pair of lamps 36, are electrically interconnected via the cord 116. So interconnected, the lamp terminals 38 are to be jointly connected to, and disconnected from, the power cord 46 by the on-off switch 48. The cord 116 is maintained in position on the back of the mirror frame 30 and along its bottom edge by a pair of retainer hooks 120 integral with the mirror frame.

Sheet-Metal Ground Conductors

With reference directed again to FIG. 7 the pair of sheet-metal ground conductors 44 can be of exactly like construction, each comprising a mount portion 122 and a lamp contact portion 124 which are integrally molded of sheet-metal material. The mount portion 122 is flat, substantially rectangular in shape, and is sized to fit in an upper part of one of the lighting compartments 34. The opposite lateral edge portions of the mount portion 122 are engaged in a pair of grooves 126, one seen in FIG. 7, defined in the lighting compartment 34.

Joined to the mount portion 122 via a connective portion 128 extending rearwardly from the bottom edge of the mount portion, the lamp contact portion 124 comprises a pair of lamp support arms 130 which are shaped and sized like the pair of lamp support arms 96 of each sheet-metal power conductor 42. Thus the lamp support arms 130 are self-biased to firmly engage the upper terminal 40 of one of the lamps 36 both mechanically and electrically. It will be seen, then, that each lamp 36 is mechanically supported in place in one of the lighting compartments 34 by one sheet-metal power conductor 42 and one sheet-metal ground conductor 44, besides having its opposite plurality terminals 38 and 40 in electrical contact with the two conductors.

FIG. 7 further shows that the mount portion 122 of each sheet-metal ground conductor 44 has a clearance hole 132 defined centrally therein. This clearance hole 132 is in alignment with another clearance hole 134 in the rear wall 74 of each lighting compartment 34, and further with a tapped hole 136, FIGS. 1 and 5, in each visor frame member 28. Each fastener element 50 of electrically conducting material, herein shown as a screw, extends through the clearance holes 132 and 134 and is threadedly engaged in the tapped hole 136. It is to be appreciated that the pair of threaded fastener elements 50 performs the triple function of: (1) fastening the pair of sheet-metal ground conductors 44 to the vanity mirror frame 30; (2) mounting the complete vanity mirror assembly 24 to the visor assembly 20 or to the visor 22; and (3) electrically grounding the upper terminals 40 of the pair of lamps 36.

ON-OFF SWITCH

Figure 5:
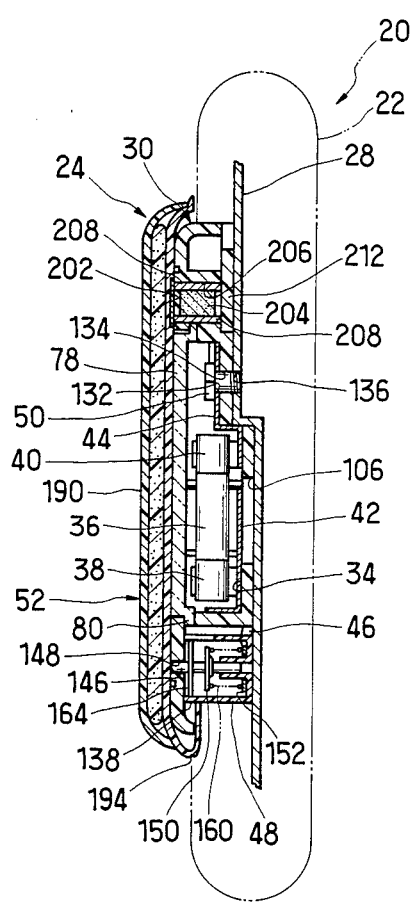
FIG. 5 is also a section through the vanity mirror assembly, taken along the line V—V in FIG. 1 and showing in particular the internal construction of one of the lighting compartments, the on-off switch, and the means for magnetically holding the mirror cover in the closed position.
Figure 8:
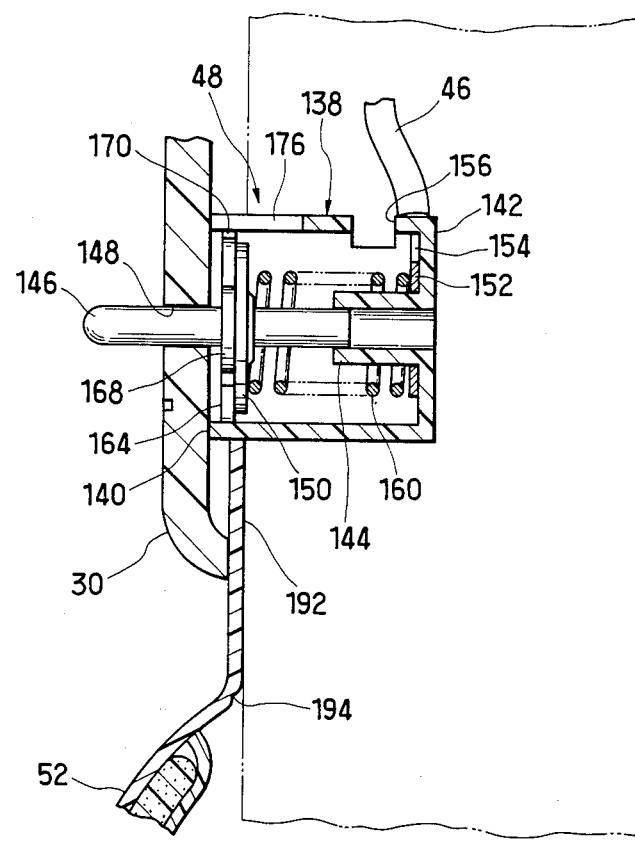
FIG. 8 is an axial section through the on-off switch for the lamps of the vanity mirror assembly, taken along the line VIII—VIII in FIG. 2.
Figure 9:
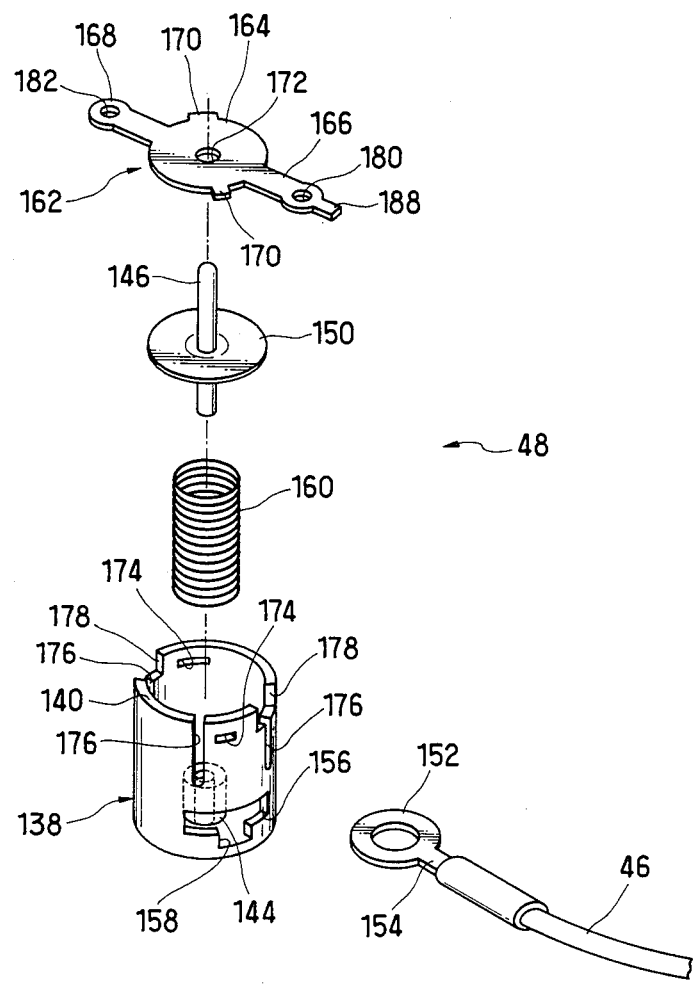
FIG. 9 is an exploded perspective view of the on-off switch of FIG. 8.
Figure 10:
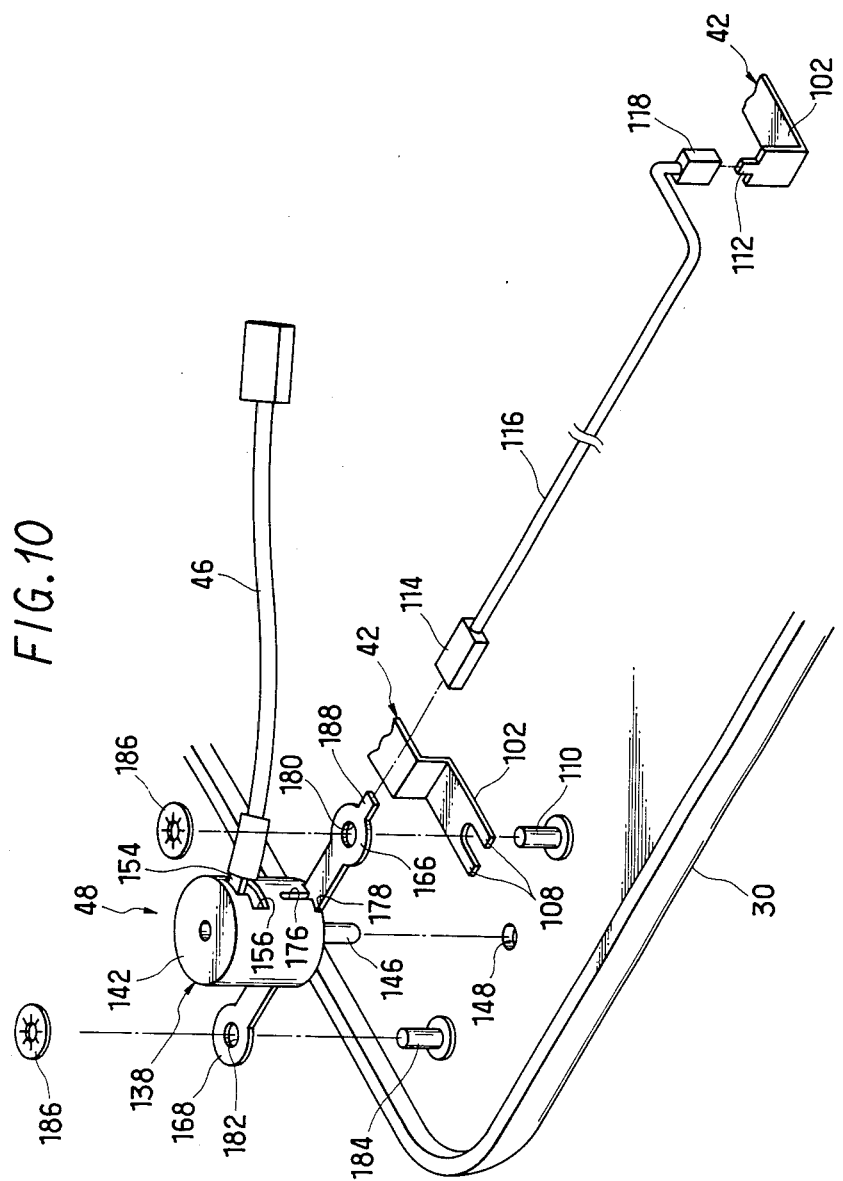
FIG. 10 is an enlarged, fragmentary, exploded perspective view of the vanity mirror assembly, the view explanatory of how the pair of sheet-metal power conductors of the mirror assembly are electrically interconnected and further coupled to the on-off switch.

Being mounted on the back of the mirror frame 30, the on-off switch 48 appears in FIGS. 3, 5 and 6 but is better illustrated in FIGS. 8-10. The switch 48 has a tubular switch housing 138 of electrically insulating material, preferably a plastic, having an open end 140 and a closed end 142. The open end 140 is held against the back of the mirror frame 40, in a position just below the left hand one, as viewed in FIGS. 3 and 6, of the lighting compartments 34, so that the axis of the tubular switch housing 138 is normal to the plane of the mirror frame 30. Molded integral with the switch housing 138 is a guide sleeve 144 which is disposed concentrically therein and which is joined to the closed end 142 of the switch housing.

An actuating pin 146 of electrically insulating material, preferably a plastic, has one end portion thereof slidably engaged in the guide sleeve 144. Another end portion of the actuating pin 146 slidably extends into a through hole 148 in the mirror frame 30 so as to be operated by the mirror cover 52, as will be later explained in more detail. A movable contact 150 in the form of a metal-made disk is rigidly and concentrically mounted on the actuating pin 146 at the midpoint of its length, so that this movable contact is movable jointly with the actuating pin 146 in the axial direction of the switch housing 138.

Also disposed within the switch housing 138 is a first fixed contact 152 which, as best seen, is in the form of a ring of sheet-metal material formed in one piece with a neck 154 coupled to the power cord 46. The annular first fixed contact 152 encircles the guide sleeve 144 and is held against the closed end 142 of the switch housing 138. The first fixed contact 152 is so mounted in place within the switch housing 138 by being inserted therein through a relatively long slot 156 defined circumferentially of the switch housing in the vicinity of its closed end 142. This slot 156 has a length somewhat greater than the diameter of the first fixed contact 138. Contiguous to the slot 156 is a shorter slot 158 which is located in the immediate adjacency of the closed end 142. This second slot has a length approximately equal to the width of the neck 154 of the first fixed contact 152. Therefore, as the first fixed contact 152 is moved into abutment against the closed end 142 following insertion through the longer slot 156, its neck 154 will become engaged in the shorter slot 158.

Encircling the guide sleeve 144 and actuating pin 146, a helical compression spring 160 extends between the movable contact 150 and first fixed contact 152 to urge the former toward the open end 140 of the switch housing 138 and the latter against its closed end 142. The spring 160 is fabricated of usual spring material that is electrically conducting, so that the movable contact 150 and first fixed contact 152 are electrically in constant engagement with each other.

Another component of the on-off switch 48 is a sheet-metal contact member 162, FIG. 9, integrally comprising a second fixed contact 164 in the form of a disk, and a pair of arms 166 and 168 extending from the second fixed contact in diametrically opposite directions. The second fixed contact 164 is sized to fit in the switch housing 138 and is formed to include a diametrically opposed pair of lugs 170 projecting radially outwardly therefrom. Slidably receiving the actuating pin 146 in its central hole 172, the second fixed contact 164 is mounted in the open end 140 of the switch housing 138 so as to be located between mirror frame 30 and movable contact 150. The pair of lugs 170 of the second fixed contact 164 are engaged one in each opening 174 formed in the switch housing 138, so that the second fixed contact 164 and therefore the complete contact member 162 are immovable with respect to the switch housing. A plurality of, three in this embodiment, slits 176 extends from the open end 140 of the switch housing 138 toward its closed end 142 to an extent approximately half the axial length of the switch housing, in order to permit the engagement of the lugs 170 in the openings 174 at the time of the assemblage of the visor assembly 20.

The switch housing 138 has a diametrically opposed pair of recesses 178 defined in its open end 140. The pair of arms 166 and 168 of the sheet-metal contact member 162 extend through the recesses 178 outwardly from the second fixed contact 164. Both of these arms 166 and 168 have holes 180 and 182 at their distal ends.

As will be understood by referring to FIGS. 3, 6 and 10, the hole 180 in the right-hand sheet-metal contact member arm 166, as viewed in these figures, receives the noted pin 110 on the back of the mirror frame 30, whereas the hole 182 in the left hand arm 168 receives another similar pin 184 integral with the mirror frame. Push nuts 186 lock the arms 166 and 168 against detachment from the pins 110 and 184, although the same purposes could be achieved by clinching these pins to provide enlarged heads after insertion into and through the arm holes 180 and 182. Thus, as the sheet-metal contact member 162 is secured to the mirror frame 30, so is the complete on-off switch 48, since the contact member 162 is rigidly coupled to the switch housing 138 via the pair of lugs 170.

It has been stated in connection with FIG. 6 that the terminal 102 of one of the sheet-metal power conductors 42, having the bifurcated end 108, is engaged with the pin 110. Accordingly, as the pin 110 is inserted in the hole 180 in the sheet-metal contact member arm 166, this arm electrically connects with that one sheet-metal power conductor 42. The other sheet-metal power conductor 42 also electrically connects with the arm 166 as a plug 188 integral therewith is engaged with the socket 114 on one extremity of the cord 116. It is thus seen that the second fixed contact 164 of the on-off switch 48 is electrically coupled to both of the pair of sheet-metal power conductors 42.

A reference back to FIG. 8 will reveal that when the mirror cover 52 is in its open position as depicted here, the actuating pin 146 protrudes forwardly of the mirror frame 30 from its hole 148 under the bias of the compression spring 160. The movable contact 150 on the actuating pin 146 is then in engagement with the second fixed contact 164. Upon closure of the mirror cover 52 as in FIG. 5, the actuating pin 146 will be thereby depressed into the switch housing 138, with the consequent disengagement of the movable contact 150 from the second fixed contact 164.

Mirror Cover

Although FIGS. 1–6 and 8 all show the mirror cover 52, FIG. 6 best illustrates that it comprises a major portion 190 of substantially flat, rectangular shape, and a back flap 192 formed along one of the longitudinal edges of the major portion and joined thereto via a "live" hinge 194. The major portion 190 is shaped and sized to completely cover the front side of the mirror frame 30, although it may cover only the vanity mirror 32 in a different embodiment of the invention.

The back flap 192 has a plurality of, five in this embodiment, holes 196 formed therethrough in a row. The extreme left-hand one, as seen in FIG. 6, of these holes 196 receives the noted pin 184, and the other four holes 196 receive similar pins 198 formed on the back of the mirror frame 30 in alignment along its bottom edge. For locking the back flap 192 against detachment from the mirror frame 30 there are employed one of the aforesaid push nuts 186 and another similar push nut 200, which are engaged with the two pins 184 and 198 received in the extreme left- and right-hand ones of the holes 196. The other three intermediate pins 196 may be clinched after insertion in and through the associated holes 196.

With its back flap 192 thus secured to the back of the mirror frame 30, the mirror cover 52 is pivotable between the closed position of FIG. 1, in which it covers the vanity mirror 32 and lighting compartments 34, and the open position of FIG. 2 in which it hangs from the mirror frame 30 under its own weight.

This embodiment employs magnetic means, set forth hereafter, for holding the mirror cover 52 in the closed position. Such magnetic means include a pair of pieces 202, FIGS. 2 and 5, of iron or like magnetizable material affixed to the inside surface of the mirror cover 52. The magnetic pieces 202 are disposed adjacent the free edge of the mirror cover 52 and are spaced from each other. For attracting the magnetic pieces 202 a pair of permanent magnets 204 are accommodated in respective recesses 206 defined in the mirror frame 30 just over the lighting compartments 34.

As will be seen also from FIG. 6, each permanent magnet 204 is sandwiched between a pair of yoke plates 208. These yoke plates 208 have their front edges 210 slightly projecting forwardly from the recesses 206 whereas the permanent magnets 204 are thoroughly received in the recesses. FIG. 6 further indicates that the mirror backing 68 is formed to include a pair of relatively small winglike portions 212 extending laterally from its opposite sides. These portions 212 serve to back the magnets 204 and yokes 208 as in FIGS. 3 and 5.

When the mirror cover 52 is in the closed position as in FIG. 2, the pair of magnetic pieces 202 on its inside surface are in contact with the edges 210 of the yokes 208 which in turn are in constant contact with the permanent magnets 204. The mirror cover 52 is thus magnetically retained in the closed position. A pull tab 214 on the mirror cover 52 may be pulled against the attractive forces of the magnets 204 for uncovering the vanity mirror 32.

Operation

Inasmuch as the operation of the visor assembly 20, and particularly of the vanity mirror assembly 24, will be apparent from the foregoing, such operation will be only briefly summarized. Let us first suppose that the mirror cover 52 is magnetically held closed as shown in FIGS. 1, 4 and 5. It will be noted from FIG. 5 that the mirror cover 52 when in the closed position holds the actuating pin 146 of the on-off switch 48 depressed into the hole 148 in the mirror frame 30 against the force of the compression spring 160. As will be best understood from an inspection of FIG. 8, the movable contact 150 of the switch 48 is out of engagement with the second fixed contact 164 when the actuating pin 146 is depressed from the illustrated position deeper into the switch housing 138. It will be recalled that the second fixed contact 164, constituting part of the sheet-metal contact member 162 best shown in FIG. 9, is electrically coupled directly to one of the sheet-metal power conductors 42 and, via the cord 116, to the other sheet-metal power conductor 42 as well. The first fixed contact 152 is coupled directly to the power cord 46 and, via the spring 160, to the movable contact 150.

Thus, when the movable contact 150 is out of engagement with the second fixed contact 164, the pair of sheet-metal power conductors 42 are both disconnected from the power cord 46. The pair of lamps 36 are therefore unlit as long as the mirror cover 52 stays in the closed position.

When the mirror cover 52 is pulled open to the FIG. 2 position against the forces of the pair of magnets 210, the actuating pin 146 of the switch 48 will be thrusted forwardly of the mirror frame 30 under the influence of the compression spring 160, until the movable contact 150 comes into engagement with the second fixed contact 164. Thereupon the pair of lamps 36 will be both lit up through the circuit comprising the power cord 46, first fixed terminal 152, compression spring 160, movable contact 150, second fixed contact 164, arm 166 of the sheet-metal contact member 162, (cord 116), sheet-metal power conductors 42, lamps 36, sheet-metal ground conductors 44, screws 50, and visor frame 26.

First Alternative Form

Figure 11:
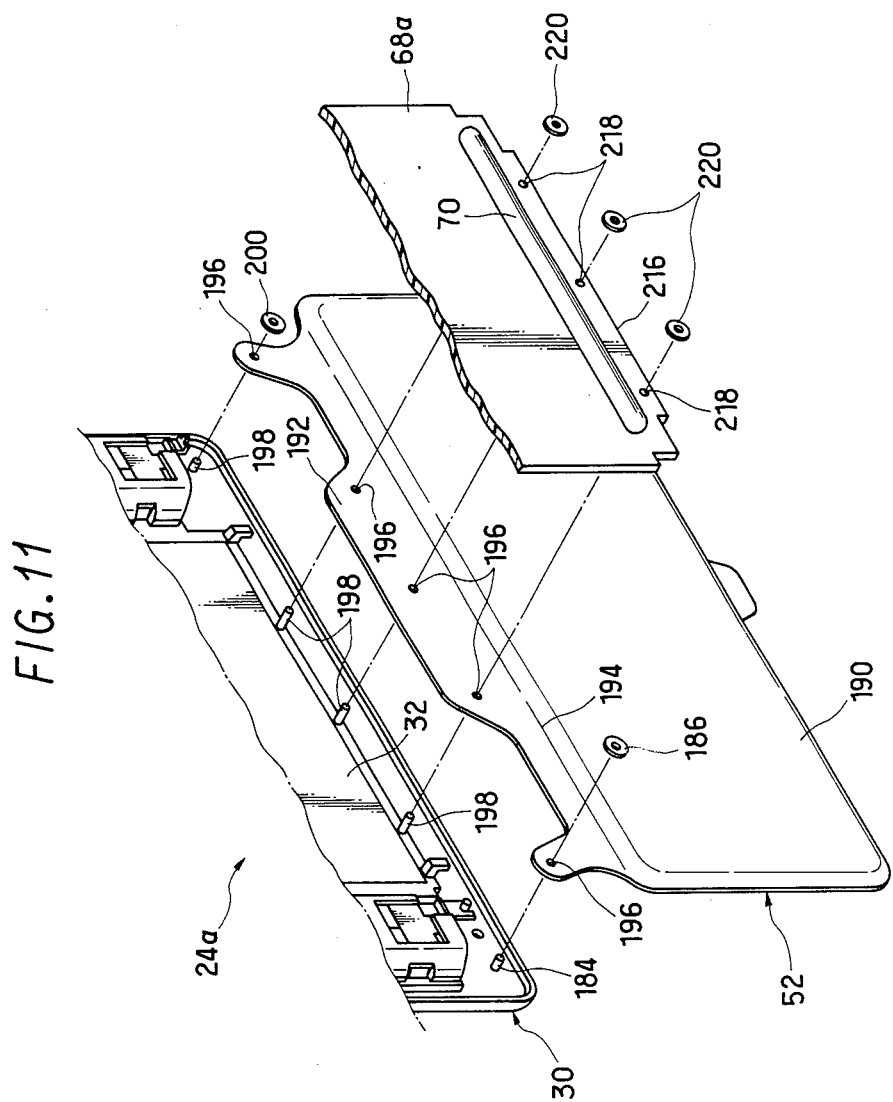
FIG. 11 is a fragmentary, exploded perspective view of a first alternative vanity mirror assembly, to be incorporated with the visor of FIGS. 1-5, featuring different means for fastening the mirror cover and mirror backing to the mirror frame.
Figure 12:
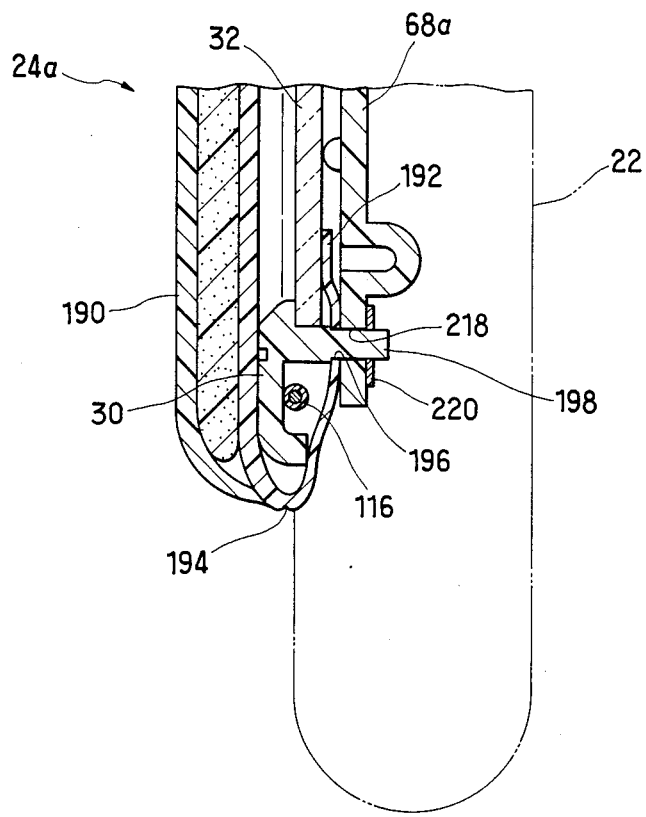
FIG. 12 is a fragmentary, enlarged vertical section through the first alternative mirror assembly of FIG. 11.

In an alternative vanity mirror assembly 24a shown in FIGS. 11 and 12, which is to be incorporated with the visor 22 of FIGS. 1–5, a vanity mirror backing 68a has its edge 216, opposite to the edge hingedly joined to the mirror frame 30, fastened to the mirror frame via the flap 192 of the mirror cover 52, instead of being left loose as in the FIGS. 1–10 mirror assembly 24. The modified mirror backing 68a has a series of, three in this embodiment, holes 218 defined along its edge 216.

These holes 218 are in alignment with all but the two extreme right- and left-hand ones of the five holes 196 in the mirror cover flap 192 and, therefore, with the three corresponding pins 198 on the back of the mirror frame 30. The mirror assembly 24a can be identical in the other details of construction with the FIGS. 1-10 mirror assembly 24.

During the assemblage of this alternative mirror assembly 24a the mirror cover 52 may first be mounted to the mirror frame 30 by engaging the mirror cover pins 184 and 198 in the holes 196 in the mirror cover flap 192. Then the mirror backing 68a may be folded back into overlapping relation to the mirror cover flap 192. Then the three mirror frame pins 198 may be inserted into and through the holes 218 in the mirror backing 68a. Then push nuts 220 may be pressed onto the three mirror frame pins 198 protruding rearwardly of the mirror backing 68a. This construction is preferred because the mounting of the mirror cover 52 and the fastening of the mirror backing 68a are achieved simultaneously.

Second Alternative Form

Figure 13:
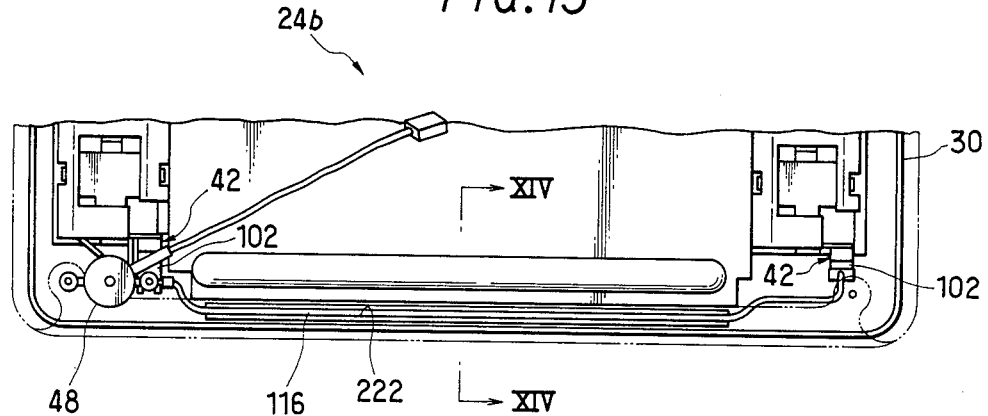
FIG. 13 is a fragmentary rear elevation of a second alternative vanity mirror assembly, also to be incorporated with the visor of FIGS. 1-5, featuring another example of means for retaining in place on the mirror frame the cord interconnecting the pair of sheet-metal power conductors.
Figure 14:
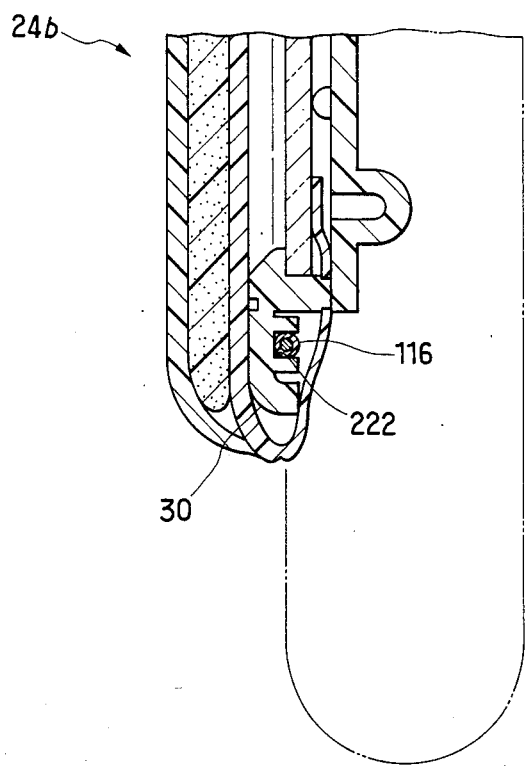
FIG. 14 is an enlarged section through the second alternative mirror assembly, taken along the line XIV—XIV in FIG. 13.

FIGS. 13 and 14 show another modified vanity mirror assembly 24b featuring a groove 222 defined in the back of the mirror frame 30 along its bottom edge in substitution for the pair of cord retainer hooks 120 of the FIGS. 1-10 mirror assembly 24. The cord 116 connecting one of the terminals 102 of the sheet-metal power conductors 42 to the on-off switch 48 is pressfitted in the groove 222 and so is retained in place on the mirror frame 30.

Third Alternative Form

Figure 15:
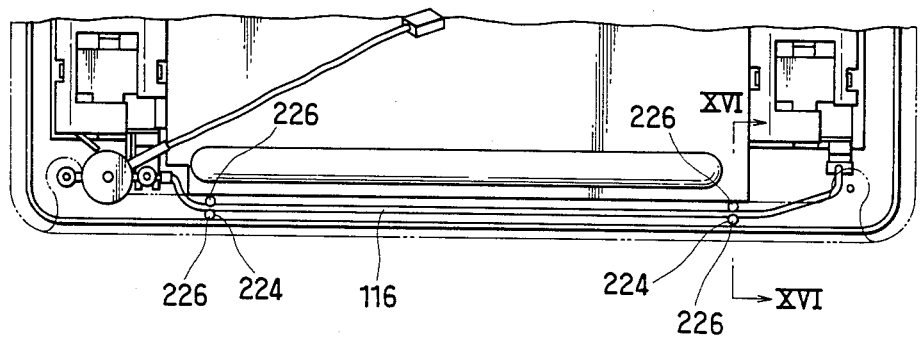
FIG. 15 is a fragmentary rear elevation of a third alternative vanity mirror assembly, also to be incorporated with the visor of FIGS. 1-5, fearing still another example of means for retaining in place on the mirror frame the cord interconnecting the pair of sheet-metal power conductors.
Figure 16:
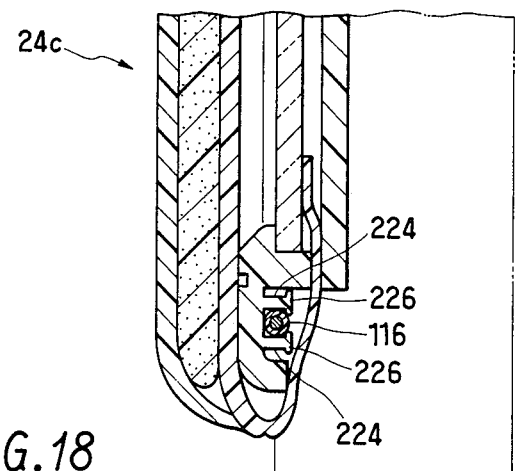
FIG. 16 is an enlarged section through the third alternative mirror assembly, taken along the line XVI—XVI in FIG. 15.

In still another modified vanity mirror assembly 24c shown in FIGS. 15 and 16 the pair of cord retainer hooks 120 of the FIGS. 1-10 mirror assembly 24 are replaced by two spaced pairs of retainer pins 224 formed in approximately the same positions on the mirror frame 30. Each pair of retainer pins 224 are spaced from each other a distance just enough to engage the cord 116 therebetween. Following the engagement of the cord 116 between each pair of retainer pins 224 these pins may be clinched to provide enlarged heads 226 to preclude the possibility of accidental cord detachment therefrom.

Fourth Alternative Form

Figure 18:
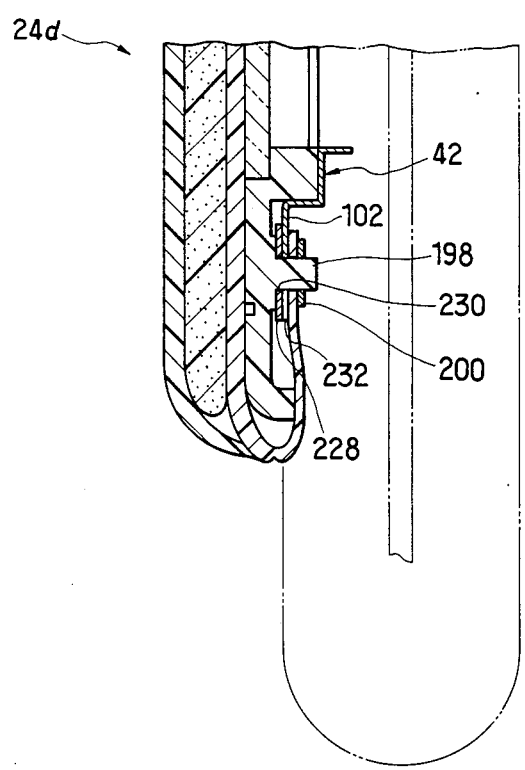
FIG. 18 is an enlarged, fragmentary vertical section through the fourth alternative mirror assembly of FIG. 17.

A further modified vanity mirror assembly 24d of FIGS. 17 and 18 incorporates a strip 228 of sheet-metal material in place of the cord 116 of all the foregoing embodiments. The sheet-metal strip 228 has a pair of holes 230 in its opposite ends for engagement with the pin 110 and the extreme right-hand pin 198, as viewed in FIG. 17, on the back of the mirror frame 30. The right-hand one, as seen in FIG. 7, of the pair of sheet-metal power conductors 42 of this mirror assembly 24d is also modified in that its terminal 102 has a bifurcated end 232 instead of the plug 112 of the FIGS. 1-10 mirror assembly 24. The bifurcated end 232 of the right-hand power conductor terminal 102 engages the extreme right hand pin 198.

As will be understood from FIG. 18, the sheet-metal strip 228 rather than the sheet-metal power conductor terminals 102 may first be engaged with the above specified two pins 110 and 198 by inserting these pins in and through the holes 230 at the opposite ends of the sheet-metal strip. So mounted to the mirror frame 30, the sheet-metal strip 228 will be maintained in position thereon by the pair of retainer hooks 120. Then the bifurcated ends 108 and 232 of the pair of sheet-metal power conductor terminals 102 may be engaged with the pins 110 and 198, with the consequent establishment of electrical connection between these power conductor terminals via the sheet-metal strip 228. The sheet-metal strip 228 will further electrically connects with the arm 166 of the sheet-metal contact member 162 as the on-off switch 48 is subsequently mounted in place on the mirror frame 30 as in the FIGS. 1-10 embodiment. The sheet-metal strip 228 can be locked against detachment from the mirror frame 30 by the push nuts 186 and 200 which are engaged with the pins 110 and 198 as in the first disclosed embodiment.

Additional modifications of this invention may be resorted to without departing from the spirit or scope of the invention.

What is claimed is:

1. A visor assembly for use on a motor vehicle or the like, comprising:
    (a) a visor having frame means of electrically conducting material to be held at ground potential;
    (b) a vanity mirror mounted to the visor;
    (c) a pair of lamps disposed on opposite sides of the vanity mirror and each having first and second terminals;
    (d) power conductor means coupled, both mechanically and electrically, to the first terminals of the lamps for conducting current thereto; and
    (e) ground conductor means coupled, both mechanically and electrically, to the second terminals of the lamps and further coupled to the frame means of the visor for grounding the second terminals of the lamps, the ground conductor means further coacting with the power conductor means for supporting the lamps in place on the visor.

2. A visor assembly for use on a motor vehicle or the like, comprising:
    (a) a visor having a visor frame of electrically conducting material to be held at ground potential;
    (b) a mirror frame of electrically insulating material mounted to the visor;
    (c) a vanity mirror supported by the mirror frame, the mirror frame defining a pair of lighting compartments on opposite sides of the vanity mirror;
    (d) a pair of lamps disposed one in each lighting compartment of the mirror frame and each having first and second terminals;
    (e) a pair of sheet-metal power conductors mounted one in each lighting compartment of the mirror frame and coupled one to the first terminal of each lamp both mechanically and electrically, the pair of sheet-metal power conductors being electrically interconnected, each sheet-metal power conductors including a mount portion immovably mounted to the mirror frame, a pair of lamp support arms embracing the first terminal of one lamp therebetween, and a terminal portion;
    (f) a power line connected to the terminal portions of the pair of sheet-metal power conductors for conducting current thereto, said power line including a separate electrically conducting member through which current from a common battery is conducted to the terminal portions, the separate electrically conducting member being held in position away from a back of the vanity mirror and extending along a periphery of the mirror frame;

(g) a pair of sheet-metal ground conductors mounted one in each lighting compartment of the mirror frame and coupled one to the second terminal of each lamp both mechanically and electrically, the sheet-metal ground conductors coacting with the sheet-metal power conductors for supporting the lamps in place in the lighting compartment, each sheet-metal ground conductor including a mount portion immovably mounted to the mirror frame and a pair of lamp support arms embracing the second terminal of one lamp therebetween; and (h) fastener means of electrically conducting material for mechanically connecting the sheet-metal ground conductors to the visor frame and thus grounding the second terminals of the lamps, the fastener means including a fastener element which fastens the mount portion of each sheet-metal ground conductor to the visor frame.

3. The visor assembly of claim 2 wherein the pair of sheet-metal power conductors are electrically interconnected by a strip of sheet-metal material having its opposite ends coupled to the terminal portions of the sheet-metal power conductors.

4. The visor assembly of claim 2 wherein the pair of sheet-metal power conductors are electrically interconnected by a length of cord having its opposite ends coupled to the terminal portions of the sheet-metal power conductors.

5. The visor assembly according to claim 2 further including
an ON-OFF switch operating in response to the open and close movement of a cover of the vanity mirror.

6. The visor assembly of claim 4 wherein the mirror frame is formed to include hook means for retaining the cord in place thereon.

7. The visor assembly of claim 4 wherein the mirror frame defines a groove for receiving the cord in order to retain the same in place on the mirror frame.

8. The visor assembly of claim 4 wherein the mirror frame is formed to include two spaced pairs of headed pins for engaging the cord therebetween in order to retain the same in place on the mirror frame.

9. A visor assembly for use on a motor vehicle or the like, comprising:
(a) a visor pivotally supported for movement to and from a working position in which the visor is disposed in an approximately vertical plane, the visor having a front side with a recess defined therein and also having an embedded visor frame of electrically conducting material to be held at ground potential;
(b) a vanity mirror assembly mounted to the visor, the vanity mirror assembly comprising:
(1) a mirror frame of electrically insulating material received in the recess in the visor;
(2) a vanity mirror supported by the mirror frame so as to face forwardly of the front side of the visor, the mirror frame defining a pair of lighting compartments on opposite sides of the vanity mirror, each lighting compartment having an open front end;
(3) a pair of lenses closing the open front ends of the lighting compartments;
(4) a pair of lamps disposed one in each lighting compartment of the mirror frame and each having first and second terminals;

(5) a pair of sheet-metal power conductors mounted one in each lighting compartment of the mirror frame and coupled one to the first terminal of each lamp both mechanically and electrically, each sheet-metal power conductor being formed to include a terminal portion disposed behind the mirror frame, the terminal portions of the pair of sheet metal power conductors being electrically interconnected;
(6) an on-off switch on the mirror frame;
(7) a power line coupled to the electrically interconnected pair of sheet-metal power conductors via the on-off switch; and
(8) a pair of sheet-metal ground conductors mounted one in each lighting compartment of the mirror frame and coupled one to the second terminal of each lamp both mechanically and electrically, the sheet-metal ground conductors coacting with the sheet-metal power conductors for supporting the lamps in place in the lighting compartments; and
(c) a pair of fastener elements of electrically conducting material each connecting one sheet-metal ground conductor to the visor frame via the mirror frame both for grounding the second terminals of the lamps and for fastening the complete vanity mirror assembly to the visor frame.

10. The visor assembly of claim 9 further comprising a mirror cover mounted to the mirror frame for pivotal motion between a closed position where the mirror cover covers at least the vanity mirror and an open position where the mirror cover uncovers the vanity mirror, and wherein the on-off switch is disposed behind the mirror frame and has an actuating pin protruding forwardly of the mirror frame, the actuating pin being responsive to the movement of mirror frame cover to the closed position for electrically disconnecting the lamps from the power line.

11. The visor assembly of claim 9 further comprising a mirror backing molding in one piece with the mirror frame and hingedly joined thereto for backing the vanity mirror.

12. A visor assembly for use on a motor vehicle or the like, comprising:
(a) a visor having a visor frame of electrically conducting material to be held at ground potential;
(b) a mirorr frame of electrically including material mounted to the visor;
(c) a vanity mirror supported by the mirror frame, the mirror frame defining a pair of lighting compartments on opposite sides of the vanity mirror;
(d) a pair of lamps disposed one in each lighting compartment of the mirror frame and each having first and second terminals;
(e) a pair of sheet-metal power conductors mounted one in each lighting compartment of the mirror frame and coupled one to the first terminal of each lamp both mechanically and electrically, the pair of sheet-metal power conductors being electrically interconnected;
(f) a power line coupled to the pair of sheet-metal power conductors for conducting current thereto;
(g) a pair of sheet-metal ground conductors mounted one in each lighting compartment of the mirror frame and coupled one to the second terminal of each lamp both mechanically and electrically, the sheet-metal ground conductors coacting with the sheet-metal power conductors for supporting the lamps in place in the lighting compartments;

(h) fastener means of electrically conducting material for connecting the sheet-metal ground conductors to the visor frame for grounding the second terminals of the lamps;

(i) a tubular switch housing mounted to the mirror frame and having first and second ends, the switch housing further having a guide sleeve which is disposed concentrically therein and which is joined to the first end of the switch housing;

(j) an actuating pin partly received in the guide sleeve for longitudinal sliding motion relative to the switch housing;

(k) a movable contact disposed within the switch housing and mounted to the actuating pin for joint movement therewith;

(l) a first fixed contact disposed within the switch housing and held against the first end thereof, the first fixed contact being electrically coupled to the power line;

(m) a spring of electrically conducting material mounted between the movable contact and the first fixed contact for biasing the movable contact and the actuating pin toward the second end of the switch housing and for holding the movable contact and the first fixed contact electrically interconnected; and (n) a second fixed contact immovably mounted at the second end of the switch housing and electrically coupled to the pair of sheet-metal power conductors, the movable contact being urged into engagement with the second fixed contact under the bias of the spring.

13. The visor assembly of claim 12 wherein the second fixed contact of the on-off switch constitutes pair of a contact member rigidly coupled to the switch housing, the contact member further comprising a pair of arms formed in one piece with the second fixed contact and extending therefrom outwardly of the switch housing, the pair of arms being secured to the mirror frame for mounting the on-off switch thereto, one of the arms being further coupled electrically to the pair of sheet-metal power conductors.

14. The visor assembly of claim 12 further comprising a mirror cover mounted to the mirror frame for pivotal motion between a closed position where the mirror cover covers the vanity mirror and an open position where the mirror cover uncovers the vanity mirror, the mirror cover when in the closed position being effective to push the actuating pin of the on-off switch toward the first end of the switch housing against the bias of the spring and hence to disengage the movable contact from the second fixed contact, the mirror cover when in the open position being effective to permit the movable contact to engage the second fixed contact under the bias of the spring.

* * * * *